(12) United States Patent
Sato et al.

(10) Patent No.: US 12,734,736 B2
(45) Date of Patent: Sep. 15, 2026

(54) INTERMEDIATE MOLD, MOLD UNIT, AND INJECTION MOLDING MACHINE

(71) Applicant: SUMITOMO HEAVY INDUSTRIES, LTD., Tokyo (JP)

(72) Inventors: Takayuki Sato, Chiba (JP); Rei Takahashi, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 35 days.

(21) Appl. No.: 18/793,403

(22) Filed: Aug. 2, 2024

(65) Prior Publication Data

US 2025/0073966 A1 Mar. 6, 2025

(30) Foreign Application Priority Data

Aug. 29, 2023 (JP) ................................ 2023-138914

(51) Int. Cl.
*B29C 45/04* (2006.01)

(52) U.S. Cl.
CPC ................................ *B29C 45/045* (2013.01)

(58) Field of Classification Search
CPC ....... B29C 45/04; B29C 45/06; B29C 45/062; B29C 45/045; B29C 45/1742; B29C 45/1756; B29C 33/30
USPC .......................................................... 425/542
See application file for complete search history.

(56) References Cited

U.S. PATENT DOCUMENTS

2008/0193586 A1 8/2008 Araujo

FOREIGN PATENT DOCUMENTS

| | | | |
|---|---|---|---|
| CN | 112 677 450 | A | 4/2021 |
| CN | 214 726 388 | U | 11/2021 |
| EP | 1 281 500 | B1 | 3/2007 |
| JP | 4283181 | B2 | 6/2009 |
| JP | 2019 111672 | A | 7/2019 |

OTHER PUBLICATIONS

European Search Report of EP Application No. 24187290.2 Mailed on Jan. 3, 2025.

*Primary Examiner* — Christina A Johnson
*Assistant Examiner* — Xue H Liu
(74) *Attorney, Agent, or Firm* — WTA IP Law P.C.

(57) ABSTRACT

There is provided an intermediate mold disposed between a stationary-side mold and a movable-side mold in a mold unit of an injection molding machine, the intermediate mold including: a support portion that supports, in an attachable and detachable manner, both sides of a rotary shaft of a mold portion that is rotated; and a connection member that is detachably connected to a top side of the support portion in a top-bottom direction, in which, in a case where the mold portion is attached to and detached from the support portion, the mold portion is attached and detached through a space formed by removing the connection member from the support portion.

14 Claims, 6 Drawing Sheets

Figures 1A, 1B:
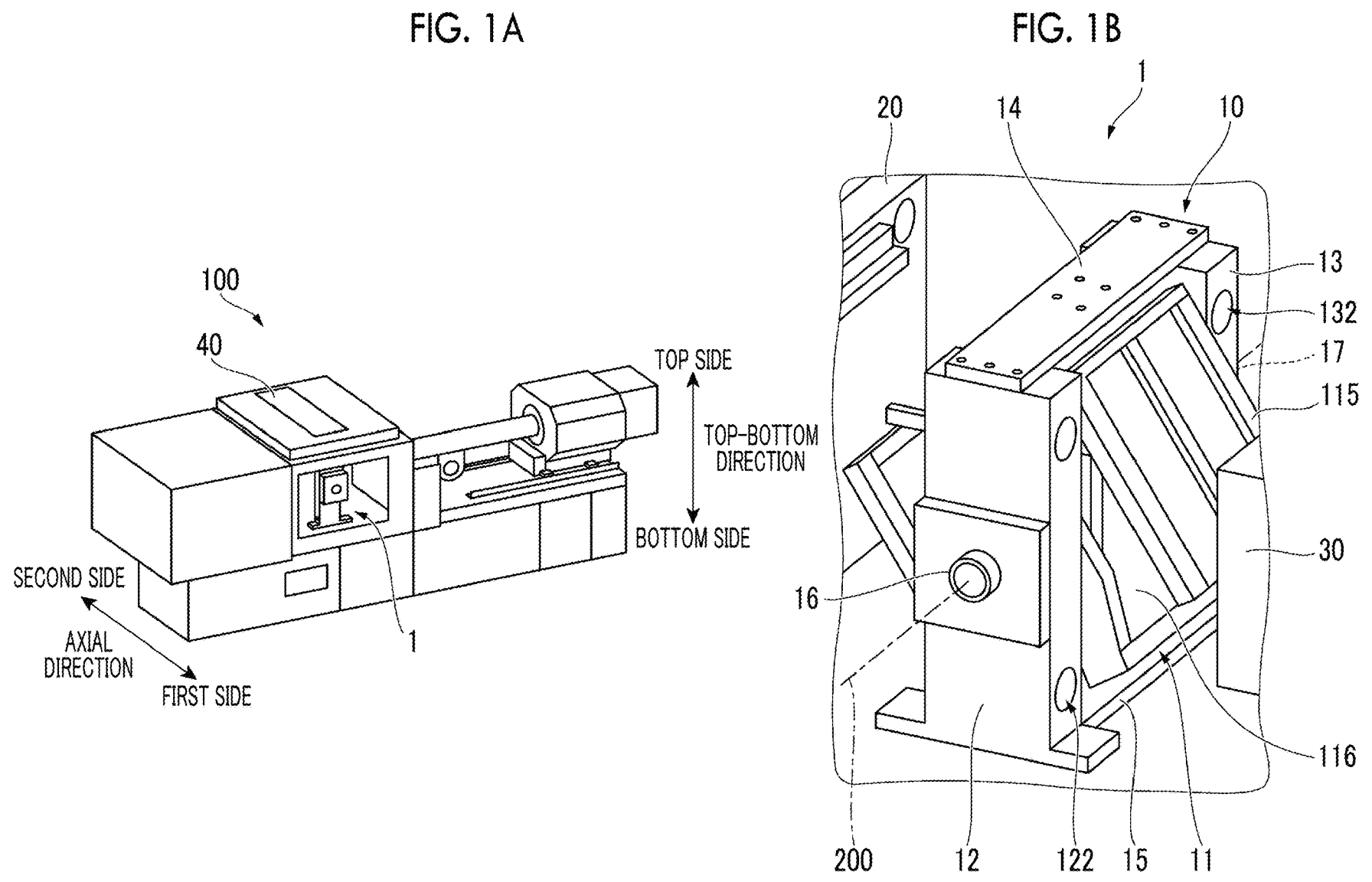

FIG. 1A 100
40
1
TOP SIDE
TOP-BOTTOM DIRECTION
BOTTOM SIDE
SECOND SIDE
AXIAL DIRECTION
FIRST SIDE

INTERMEDIATE MOLD, MOLD UNIT, AND INJECTION MOLDING MACHINE

CROSS-REFERENCE TO RELATED APPLICATIONS

This application claims priority to Japanese Patent Application No. 2023-138914, filed on Aug. 29, 2023, which is incorporated by reference herein in its entirety.

BACKGROUND

Technical Field

Certain embodiments of the present invention relate to an intermediate mold, a mold unit, and an injection molding machine.

Description of Related Art

As a mold unit that constitutes an injection molding machine, there is a mold unit in which an intermediate mold is disposed between a stationary-side mold and a movable-side mold. In addition, as the intermediate mold, there is a mold that is rotatable in a state of being supported by a support frame (for example, the related art). In a case of maintenance, such an intermediate mold is taken out from the support frame and is taken out to the outside of the injection molding machine.

SUMMARY

According to an embodiment of the present invention, there is provided an intermediate mold disposed between a stationary-side mold and a movable-side mold in a mold unit of an injection molding machine, the intermediate mold including a support portion that supports, in an attachable and detachable manner, both sides of a rotary shaft of a mold portion that is rotated; and a connection member that is detachably connected to a top side of the support portion in a top-bottom direction, in which in a case where the mold portion is attached to and detached from the support portion, the mold portion is attached and detached through a space formed by removing the connection member from the support portion.

Here, the support portion may be able to be disassembled into a first support member that supports one side of the rotary shaft, and a second support member that supports the other side of the rotary shaft, and may be fixed to the injection molding machine.

In addition, the support portion may be able to be disassembled into the first support member, the second support member, and a coupling member that performs positioning of the first support member and the second support member.

In addition, the support portion may have an integral structure, and may be fixed to the injection molding machine.

In addition, the support portion may support, in an attachable and detachable manner, shaft bodies that are detachably attached to both sides of the mold portion, respectively.

In addition, the support portion may support, in an attachable and detachable manner, both sides of a shaft body penetrating the mold portion.

In addition, a jig that fixes the connection member and the mold portion may be able to be attached to and detached from the connection member and the mold portion.

In addition, according to another embodiment of the present invention, there is provided a mold unit of an injection molding machine, in which an intermediate mold disposed between a stationary-side mold and a movable-side mold includes a support portion that supports, in an attachable and detachable manner, both sides of a rotary shaft of a mold portion that is rotated, and a connection member that is detachably connected to a top side of the support portion in a top-bottom direction, and in a case where the mold portion is attached to and detached from the support portion, the mold portion is attached and detached through a space formed by removing the connection member from the support portion.

In addition, according to still another embodiment of the present invention, there is provided an injection molding machine mounted with a mold unit including a stationary-side mold, a movable-side mold, and an intermediate mold disposed between the stationary-side mold and the movable-side mold, in which the intermediate mold includes a support portion that supports, in an attachable and detachable manner, both sides of a rotary shaft of a mold portion that is rotated, and a connection member that is detachably connected to a top side of the support portion in a top-bottom direction, and in a case where the mold portion is attached to and detached from the support portion, the mold portion is attached and detached through a space formed by removing the connection member from the support portion.

BRIEF DESCRIPTION OF THE DRAWINGS

FIGS. 1A and 1B are perspective views illustrating an example of an external appearance configuration of each of an injection molding machine according to one embodiment and a part of a mold unit mounted on the injection molding machine.

FIG. 3A is a perspective view illustrating an example of an external appearance configuration of support members, a connection member, and a coupling member among a plurality of members constituting the intermediate mold.

FIG. 3B is a front view illustrating an example of the external appearance configuration of the support member, the connection member, and the coupling member among the plurality of members constituting the intermediate mold.

DETAILED DESCRIPTION

Since the support frame constituting the intermediate mold in the related art has an integral structure, the intermediate mold may be disassembled into a plurality of plates in order to take out the intermediate mold to the outside of the injection molding machine. However, in this case, a member for sealing a pipe path needs to be disposed on a plate mating surface, and in a case where the size of the intermediate mold is increased in order to secure a disposition location thereof, the size of the injection molding machine also needs to be increased. In addition, in a case where the intermediate mold cannot be disassembled into a plurality of members in terms of design, even in a case where the intermediate mold is removed from the support frame, the support frame gets in the way so that the intermediate mold cannot be taken out from the injection molding machine.

It is desirable to improve maintainability of the intermediate mold that constitutes the mold unit.

Hereinafter, embodiments of the present invention will be described in detail with reference to the accompanying drawings.

One Embodiment

Configuration of Injection Molding Machine

FIGS. 1A and 1B are perspective views illustrating an example of an external appearance configuration of each of an injection molding machine 100 according to one embodiment and a part of a mold unit 1 mounted on the injection molding machine 100.

Figure 2:
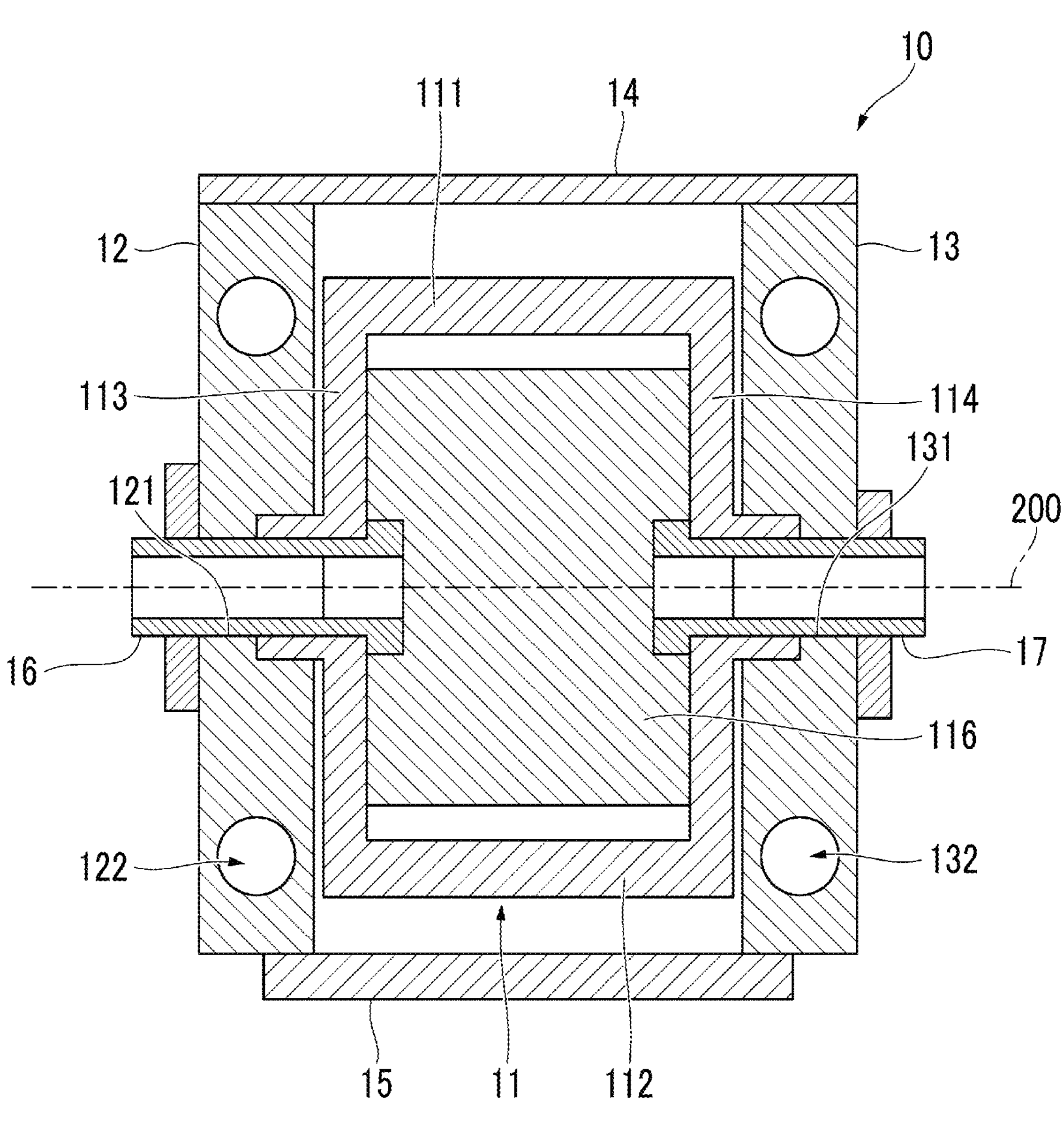
FIG. 2 is a sectional view illustrating an example of a configuration of an intermediate mold of the mold unit.

FIG. 2 is a sectional view illustrating an example of a configuration of an intermediate mold 10 of the mold unit 1.

Figures 3A, 3B:
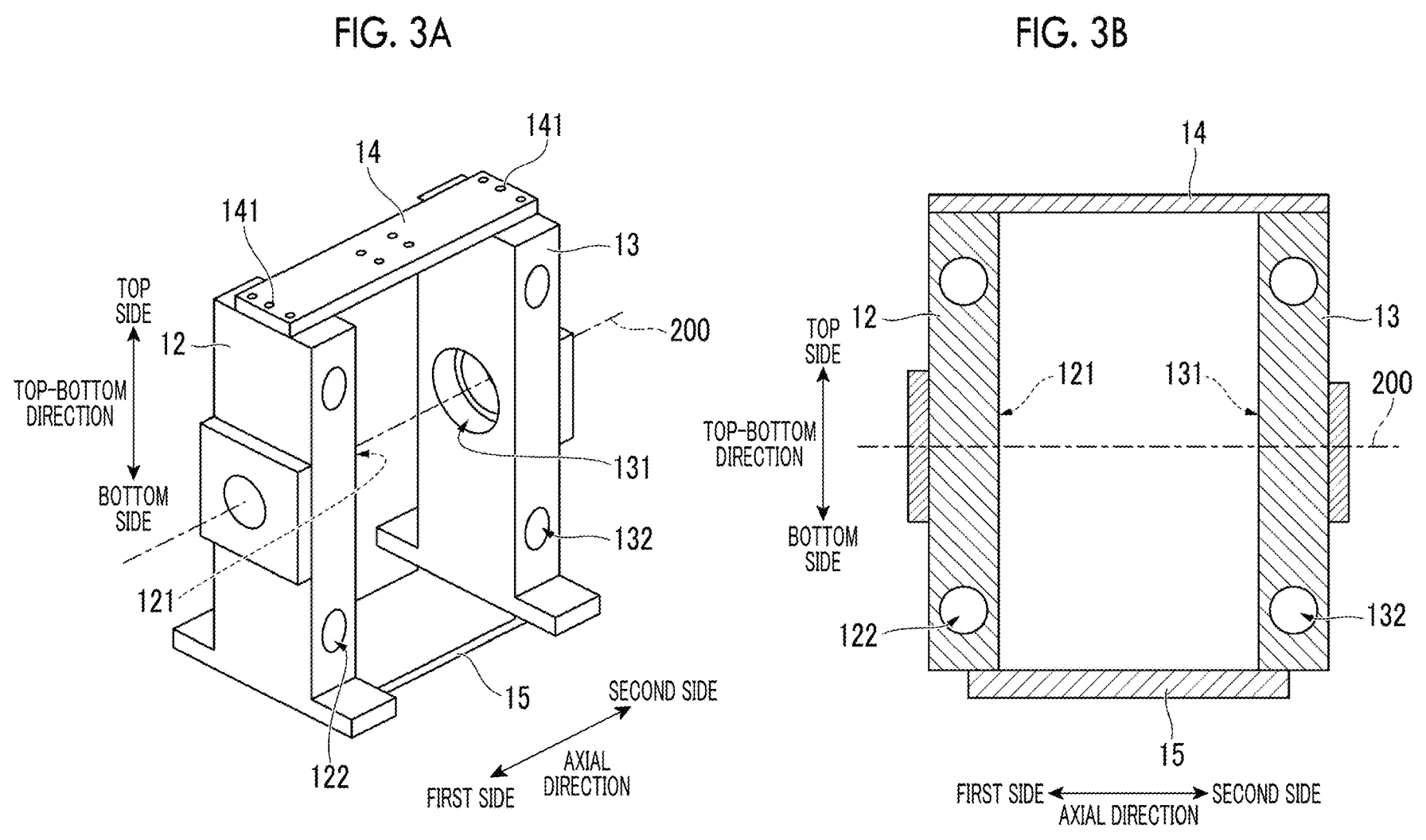

FIG. 3A is a perspective view illustrating an example of an external appearance configuration of support members 12 and 13, a connection member 14, and a coupling member 15 among a plurality of members constituting the intermediate mold 10. FIG. 3B is a front view illustrating an example of the external appearance configuration of the support members 12 and 13, the connection member 14, and the coupling member 15 among the plurality of members constituting the intermediate mold 10.

The injection molding machine 100 illustrated in FIGS. 1A and 1B is a molding machine used for injection blow molding. The injection blow molding refers to a molding method in which injection molding and blow molding are performed in two stages. In the injection blow molding, first, a preform serving as a base form of a product is molded in the injection molding. Then, in the blow molding, a product is molded by sending air to the inside of the preform and expanding the preform.

The injection molding machine 100 is mounted with the mold unit 1 that enables injection blow molding. The mold unit 1 includes a stationary-side mold 30, a movable-side mold 20, and the intermediate mold 10 disposed between the stationary-side mold 30 and the movable-side mold 20. The mold unit 1 performs injection molding by mold clamping between the stationary-side mold 30 and the intermediate mold 10, and performs blow molding by mold clamping between the movable-side mold 20 and the intermediate mold 10.

As illustrated in FIGS. 1A to 2, the intermediate mold 10 includes a mold portion, a support portion, the connection member 14, and shaft bodies 16 and 17. The mold portion includes a rotating frame body 11 and plate units 115 and 116 including a plurality of mold plates. The support portion includes the support members 12 and 13 and the coupling member 15. The rotating frame body 11 in the mold portion is a metal frame body that is rotated by a rotary shaft 200, and includes a top-side portion 111, a bottom-side portion 112, a first side portion 113, and a second side portion 114, which are coupled to each other by a bolt or the like.

In addition, the plate units 115 and 116 including the plurality mold plates are detachably attached to the rotating frame body 11. In the present embodiment, the description is made in which the rotating frame body 11 is assembled with the plate-shaped top-side portion 111, the bottom-side portion 112, the first side portion 113, and the second side portion 114 (the boundary between the respective portions is not illustrated). However, the top-side portion 111, the bottom-side portion 112, the first side portion 113, and the second side portion 114 may be integrally formed, or may be formed by assembling a plurality of components.

The shaft body 16 that is rotated by the rotary shaft 200 is detachably attached to the first side portion 113 of the rotating frame body 11. In addition, the shaft body 17 that is rotated by the rotary shaft 200 is detachably attached to the second side portion 114 of the rotating frame body 11. The shaft body 16 and the shaft body 17 are removed outward of the rotating frame body 11 after a bearing (not illustrated) provided in each of the rotating frame body 11 and the support members 12 and 13 is removed outward.

In the mold portion, in a case where the rotating frame body 11 is rotated by the rotary shaft 200, the plate unit 115 is also rotated. By rotating the rotating frame body 11 to which the plate unit 115 is attached, a position where the injection molding (injection molding) is performed and a position where the blow molding is performed are alternately switched. Note that the plate unit 116 is detachably attached to the rotating frame body 11 via a member (not illustrated). However, the plate unit 116 is configured not to be rotated, unlike the plate unit 115.

As illustrated in FIGS. 2 and 3, the support member 12 is a support member that supports the first side portion 113 of the rotating frame body 11 in an attachable and detachable manner. The support member 12 includes a bearing portion 121 that supports the shaft body 16 attached to the first side portion 113 of the rotating frame body 11 in an attachable and detachable manner. In addition, the support member 12 includes through-holes 122 for sliding a tie bar (not illustrated) that guides an opening and closing operation of the mold. The through-hole 122 is a hole that penetrates in a direction perpendicular to an axial direction (a direction in which the mold is opened and closed), and is provided in the vicinity of an end portion on each of a top side and a bottom side of the support member 12 in a top-bottom direction. In addition, the connection member 14 and the coupling member 15 are detachably connected to the support member 12. The support member 12 is fixed to the inside of the injection molding machine 100 via the coupling member 15.

As illustrated in FIGS. 2 and 3, the support member 13 is a support member that supports the second side portion 114 of the rotating frame body 11 in an attachable and detachable manner. The support member 13 includes a bearing portion 131 that supports the shaft body 17 attached to the second side portion 114 of the rotating frame body 11 in an attachable and detachable manner. In addition, the support member 13 includes through-holes 132 for sliding the tie bar. The through-hole 132 is a hole that penetrates in the direction perpendicular to the axial direction, and is provided in the vicinity of an end portion on each of a top side and a bottom side of the support member 13. In addition, the connection member 14 and the coupling member 15 are detachably connected to the support member 13. The support member 13 is fixed to the inside of the injection molding machine 100 via the coupling member 15.

The connection member 14 is a member detachably connected to the top sides of the support member 12 and the support member 13. Each of a connecting part between the connection member 14 and the support member 12 and a connecting part between the connection member 14 and the support member 13 is detachably connected by a bolt 141.

The coupling member 15 is a member detachably connected to the bottom sides of the support member 12 and the support member 13, and is detachably fixed to the inside of the injection molding machine 100. Therefore, each of the support member 12 and the support member 13 connected to the coupling member 15 is fixed to a predetermined position inside the injection molding machine 100 via the coupling member 15. Therefore, the coupling member 15 functions as a member that performs positioning of the support member 12 and the support member 13.

The shaft body 16 and the shaft body 17 are members that are rotated by the rotary shaft 200. The shaft body 16 is supported by the bearing portion 121 of the support member 12 in a state of being attached to the first side portion 113 of the rotating frame body 11. The shaft body 17 is supported by the bearing portion 131 of the support member 13 in a state of being attached to the second side portion 114 of the rotating frame body 11. A drive unit (not illustrated) for rotating the shaft body 17 is connected to the shaft body 17.

The rotating frame body 11, the support member 12, the support member 13, the connection member 14, the coupling member 15, the shaft body 16, and the shaft body 17 that constitute the intermediate mold 10 can be disassembled. Therefore, for example, in a case of performing the maintenance of the plate units 115 and 116 attached to the rotating frame body 11, each of the shaft bodies 16 and 17 and the connection member 14 which are attached to the support member 12 and the support member 13 are removed. In a case where the connection member 14 is removed, a space can be secured on the top side of the intermediate mold 10.

In a case where a space is secured on the top side of the intermediate mold 10, the rotating frame body 11 to which the plate units 115 and 116 are attached is taken out and maintenance is performed by using the space. Specifically, a cover on the top side of the injection molding machine 100 illustrated in FIGS. 1A and 1B is slid, the rotating frame body 11 to which the plate units 115 and 116 are attached is taken out through the space opened by the sliding, and the maintenance is performed. Note that a window portion 40 for visualizing the inside or the like may be provided in the cover on the top side, but in a case where the window portion 40 has a sufficient width for performing the maintenance, the maintenance may be performed by opening the window portion 40 and taking out the rotating frame body 11 to which the plate units 115 and 116 are attached, from the window portion 40. The details of specific work in a case of taking out the rotating frame body 11 to which the plate units 115 and 116 are attached will be described later with reference to FIG. 4.

Figure 4:
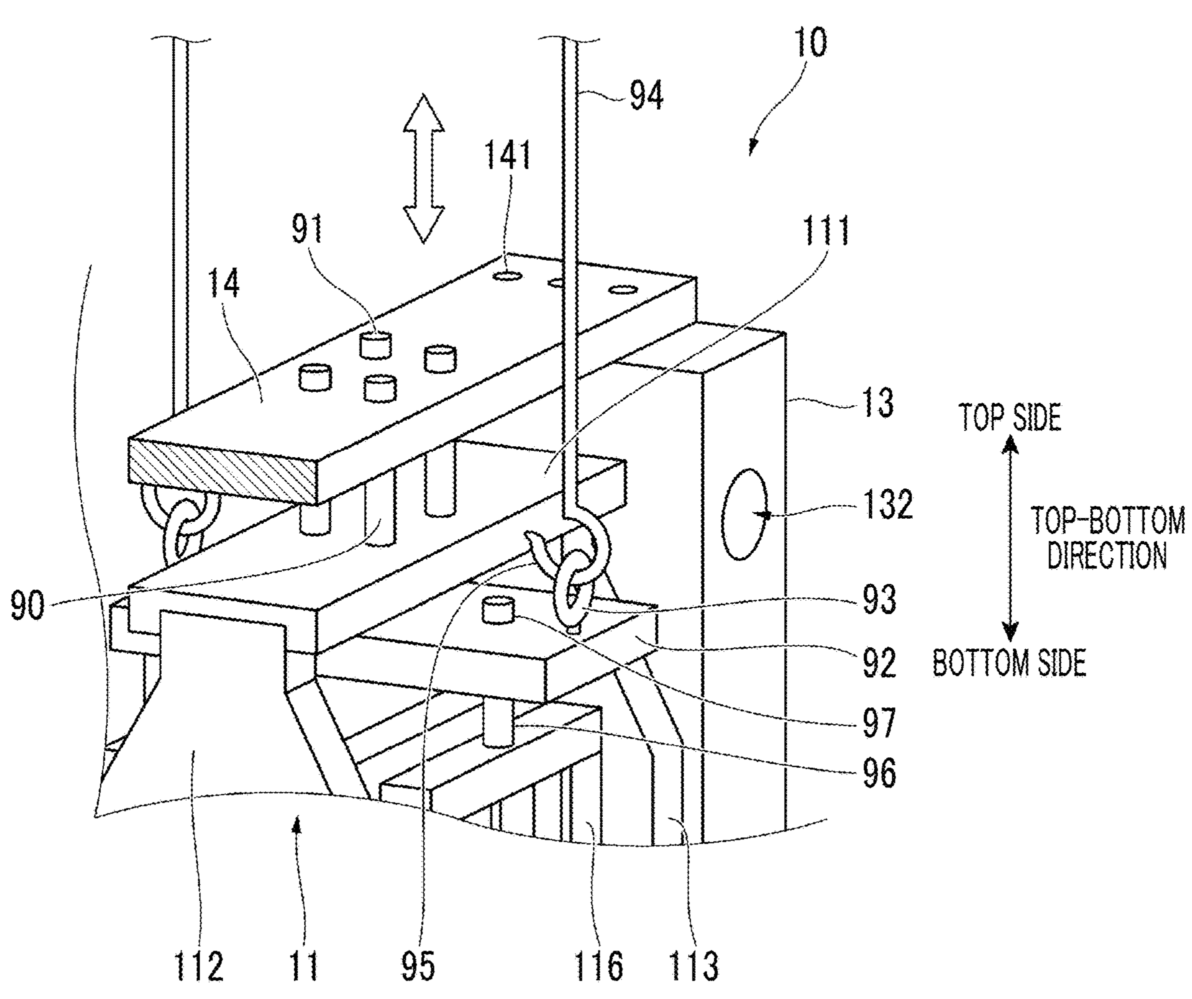
FIG. 4 is a view illustrating a state of attachment and detachment work when maintenance of the intermediate mold is performed.

FIG. 4 is a view illustrating a state of attachment and detachment work when maintenance of the intermediate mold 10 is performed. FIG. 4 illustrates a part of the intermediate mold 10 on which a jig for connecting a lifting bar 92 and the intermediate mold 10 is mounted, the lifting bar 92 supporting the top-side portion 111 of the intermediate mold 10 from the bottom side in the top-bottom direction to stabilize a lifting state, such as a posture when the rotating frame body 11 is lifted to the top side. Note that, in FIG. 4, the illustration of the support member 12 (refer to FIG. 2) and the plate unit 115 (refer to FIG. 1B) is omitted in order to make it easy to see a state where the jig is mounted.

In a case where maintenance of the intermediate mold 10 is performed, a cylindrical jig 90 is attached to the intermediate mold 10 to connect and fix the top-side portion 111 of the rotating frame body 11 and the connection member 14 to each other. In addition, a cylindrical jig 96 is attached to connect and fix the lifting bar 92 and the plate unit 116 to each other. The jig 90 is attached by using a bolt 91, and the jig 96 is attached by using a bolt 97. Accordingly, the plate unit 116 and the plate unit 115 (not illustrated) (hereinafter, referred to as "plate unit 116 or the like" in the description of FIG. 4) are fixed to the lifting bar 92 via the jig 96, and the lifting bar 92 is fixed to the top-side portion 111 or the connection member 14 via the bolt 91 or the jig 90.

That is, in order to remove the plate unit 116 or the like from the intermediate mold 10 during maintenance, it is necessary to create a state where the shaft bodies 16 and 17 are removed. However, the top-side portion 111, the bottom-side portion 112, the first side portion 113, and the second side portion 114 of the rotating frame body 11 and the plate unit 116 or the like are placed on the shaft bodies 16 and 17. Here, as described above, the plate unit 116 or the like is fixed to the lifting bar 92 via the jig 96, and the lifting bar 92 is fixed to the top-side portion 111 or the connection member 14 via the bolt 91 or the jig 90. The connection member 14 is larger than the support members 12 and 13, and thus, the connection member 14 can support the plate unit 116 or the like even in a state where the shaft bodies 16 and 17 are not provided.

With the above configuration, the rotating frame body 11 to which the plate unit 116 or the like is attached and the connection member 14 can be taken out integrally. In addition, it is possible to prevent the rotating frame body 11 from being rotated when the rotating frame body 11 and the connection member 14 are taken out or moved. In addition, in the example of FIG. 4, the top-side portion 111 of the rotating frame body 11 and the connection member 14 are connected by using the jig 90, but the present invention is not limited thereto. For example, the top-side portion 111 of the rotating frame body 11 and the lifting bar 92 may be connected to each other. In this case, the rotating frame body 11 can be taken out separately from the connection member 14 through the space on the top side formed by removing the connection member 14.

Next, as illustrated in FIG. 4, the lifting bar 92 is disposed at a position where the top-side portion 111 of the rotating frame body 11 can be supported from the bottom side. Note that a hanging tool 93 is attached to each of both end portions of the lifting bar 92. In addition, a hook 95 of a crane 94 is hung on each hanging tool 93, and the hanging tool 93 is in a state where the hanging tool 93 can be lifted to the top side.

Next, the shaft body 16 is removed from the first side portion 113 of the rotating frame body 11, and the shaft body 17 is removed from the second side portion 114 of the rotating frame body 11. In addition, the connection member 14 is removed from the support members 12 and 13. Accordingly, the combination of the rotating frame body 11 to which the plate unit 116 or the like is attached and the connection member 14 is in a free state toward the top side, and a sufficient space is secured on the top side of the intermediate mold 10. Next, the rotating frame body 11 to which the plate unit 116 or the like is attached and the connection member 14 are lifted integrally using the crane 94, and are taken out to the outside of the injection molding machine 100. Specifically, the rotating frame body 11 and the connection member 14 are taken out to the outside from the window portion 40 (refer to FIGS. 1A and 1B) of the injection molding machine 100. After that, maintenance is started.

In a case where maintenance is completed, the jig 90 is attached to the top-side portion 111 of the rotating frame body 11 and the connection member 14 again. In addition, the lifting bar 92 is disposed on the bottom side of the top-side portion 111, and the jig 96 is attached to the lifting bar 92 and the plate unit 116 again. Then, the rotating frame body 11 to which the plate unit 116 or the like is attached and the connection member 14 are lifted integrally by using the crane 94, and are returned to the inside of the injection molding machine 100. Specifically, the rotating frame body 11 and the connection member 14 are returned to the inside from the window portion 40 of the injection molding machine 100. Then, the rotating frame body 11 and the connection member 14 are attached to the support members 12 and 13 fixed to the injection molding machine 100, and finally, the lifting bar 92 and the jig 90 are removed. In this manner, the attachment and detachment work when maintenance of the intermediate mold 10 is performed is completed.

In summary, the intermediate mold, the mold unit, and the injection molding machine to which the present invention is applied may only need to have the following configuration and can take various embodiments.

That is, the intermediate mold 10 according to one embodiment is the intermediate mold disposed between the stationary-side mold 30 and the movable-side mold 20 in the mold unit 1 of the injection molding machine 100, and the intermediate mold 10 includes the support portion (the support member 12, the support member 13, and the coupling member 15) that supports, in an attachable and detachable manner, both sides (the first side portion 113 and the second side portion 114) of the rotary shaft 200 of the mold portion (the rotating frame body 11 to which the plate unit 115 is attached) that is rotated; and the connection member 14 that is detachably connected to the top side of the support portion in the top-bottom direction, in which in a case where the mold portion is attached to and detached from the support portion, the mold portion is attached and detached through a space (space formed on the top side of the intermediate mold 10) formed by removing the connection member 14 from the support portion.

Accordingly, the connection member 14 connected to the top side of the support portion supporting the rotary shaft 200 of the mold portion is attachable and detachable, and when the mold portion is attached to and detached from the support portion, the mold portion is attached to and detached through a space formed by removing the connection member 14 from the support portion. As a result, a space for taking out the mold portion to the outside of the injection molding machine 100 during maintenance can be secured on the top side. In addition, since the connection member 14 and the mold portion can be taken out integrally with each other, the maintainability is improved.

In addition, the present embodiment is superior in that the mold portion is attachable and detachable through the space formed on the top side by removing the connection member 14, as compared to a case where the intermediate mold is disassembled into a plurality of plates to be attached and detached in a direction other than the top side (for example, in an axial direction or a direction in which the mold is opened and closed) in order to take out the intermediate mold to the outside of the injection molding machine, or a case where a member for supporting the mold portion of the intermediate mold from both sides with the bearing is disassembled to be attached and detached in a direction other than the top side.

Furthermore, unlike a case where the intermediate mold is disassembled into a plurality of plates in order to take out the intermediate mold to the outside of the injection molding machine, it is not necessary to dispose a member for sealing a pipe path on the plate mating surface, and thus it is not necessary to increase the size of the intermediate mold 10 in order to secure a disposition location of the member for sealing the pipe path. As a result, the size of the intermediate mold 10 can be made compact, and thus the size of the injection molding machine 100 can also be made compact.

Here, the support portion may be able to be disassembled into the support member 12 that supports the first side of the rotary shaft 200 and the support member 13 that supports the second side of the rotary shaft 200, and may be fixed to the injection molding machine 100.

Accordingly, the support portion is fixed to the injection molding machine in a state where the support portion is able to be disassembled into the support member 12 and the support member 13, and therefore, the attachment and detachment of the shaft body during the maintenance of the mold portion is facilitated.

In addition, the support portion may be able to be disassembled into the support member 12, the support member 13, and the coupling member 15 that performs positioning of the support member 12 and the support member 13.

Accordingly, the support portion is able to be disassembled into the support member 12, the support member 13, and the coupling member 15, and the coupling member 15 performs positioning of the support member 12 and the support member 13. As a result, for example, even in a case where the support member 12 and the support member 13 are disassembled from each other at the time of maintenance of the mold portion, the installation work after the maintenance is facilitated.

In addition, the support portion may be an integral structure (a structure that is not disassembled into the support member 12, the support member 13, and the coupling member 15), and may be fixed to the injection molding machine 100.

Accordingly, the support portion has an integral structure and is fixed to the injection molding machine 100, and thus, even in a case where the mold portion is taken out of the injection molding machine 100 during maintenance, the support portion remains in a state of being fixed to the inside of the injection molding machine 100. As a result, for example, even in a case where the tie bar penetrates the support portion, the maintenance of the mold portion can be performed outside the injection molding machine 100 while maintaining the state.

In addition, the support portion may support, in an attachable and detachable manner, each of the shaft bodies 16 and 17 detachably attached to both sides of the mold portion, respectively.

Accordingly, the support portion supports, in an attachable and detachable manner, each of the shaft bodies 16 and 17 detachably attached to both sides of the mold portion, respectively. In this case, the shaft body does not penetrate the mold portion, and therefore, it is not necessary to perform work of inserting and removing the shaft body during maintenance.

In addition, the jig 90 that fixes the connection member 14 and the mold portion may be able to be attached to and detached from the connection member 14 and the mold portion.

Accordingly, when the connection member 14 and the mold portion are removed from the support portion, the connection member 14 and the mold portion can be taken out integrally.

In addition, the mold unit 1 according to one embodiment is the mold unit of the injection molding machine 100, in which the intermediate mold 10 disposed between the stationary-side mold 30 and the movable-side mold 20 includes the support portion (the support member 12, the support member 13, and the coupling member 15) that supports, in an attachable and detachable manner, both sides (the first side portion 113 and the second side portion 114) of the rotary shaft 200 of the mold portion (the rotating frame body 11 to which the plate unit 115 is attached) that is rotated, and the connection member 14 that is detachably connected to the top side of the support portion in the top-bottom direction, and in a case where the mold portion is attached to and detached from the support portion, the mold portion is attached and detached through a space (space formed on the top side of the intermediate mold 10) formed by removing the connection member 14 from the support portion.

Accordingly, the connection member 14 connected to the top side of the support portion supporting the rotary shaft 200 of the mold portion is attachable and detachable, and when the mold portion is attached to and detached from the support portion, the mold portion is attached to and detached through a space formed by removing the connection member 14 from the support portion. As a result, a space for taking out the mold portion to the outside of the injection molding machine 100 during maintenance can be secured on the top side. In addition, since the connection member 14 and the mold portion can be taken out integrally with each other, the maintainability is improved.

In addition, the present embodiment is superior in that the mold portion is attachable and detachable through the space formed on the top side by removing the connection member 14, as compared to a case where the intermediate mold is disassembled into a plurality of plates to be attached and detached in a direction other than the top side (for example, in an axial direction or a direction in which the mold is opened and closed) in order to take out the intermediate mold to the outside of the injection molding machine, or a case where a member for supporting the mold portion of the intermediate mold from both sides with the bearing is disassembled to be attached and detached in a direction other than the top side.

Furthermore, unlike a case where the intermediate mold is disassembled into a plurality of plates in order to take out the intermediate mold to the outside of the injection molding machine, it is not necessary to dispose a member for sealing a pipe path on the plate mating surface, and thus it is not necessary to increase the size of the intermediate mold 10 in order to secure a disposition location of the member for sealing the pipe path. As a result, the size of the intermediate mold 10 can be made compact, and thus the size of the injection molding machine 100 can also be made compact.

In addition, the injection molding machine 100 according to one embodiment is the injection molding machine mounted with the mold unit 1 including the stationary-side mold 30, the movable-side mold 20, and the intermediate mold 10 disposed between the stationary-side mold 30 and the movable-side mold 20, in which the intermediate mold 10 includes the support portion (the support member 12, the support member 13, and the coupling member 15) that supports, in an attachable and detachable manner, both sides (the first side portion 113 and the second side portion 114) of the rotary shaft 200 of the mold portion that is rotated, and the connection member 14 that is detachably connected to the top side of the support portion in the top-bottom direction, and in a case where the mold portion is attached to and detached from the support portion, the mold portion is attached and detached through a space (space formed on the top side of the intermediate mold 10) formed by removing the connection member 14 from the support portion.

Accordingly, the connection member 14 connected to the top side of the support portion supporting the rotary shaft 200 of the mold portion is attachable and detachable, and when the mold portion is attached to and detached from the support portion, the mold portion is attached to and detached through a space formed by removing the connection member 14 from the support portion. As a result, a space for taking out the mold portion to the outside of the injection molding machine 100 during maintenance can be secured on the top side. In addition, since the connection member 14 and the mold portion can be taken out integrally with each other, the maintainability is improved.

In addition, the present embodiment is superior in that the mold portion is attachable and detachable through the space formed on the top side by removing the connection member 14, as compared to a case where the intermediate mold is disassembled into a plurality of plates to be attached and detached in a direction other than the top side (for example, in an axial direction or a direction in which the mold is opened and closed) in order to take out the intermediate mold to the outside of the injection molding machine, or a case where a member for supporting the mold portion of the intermediate mold from both sides with the bearing is disassembled to be attached and detached in a direction other than the top side.

Furthermore, unlike a case where the intermediate mold is disassembled into a plurality of plates in order to take out the intermediate mold to the outside of the injection molding machine, it is not necessary to dispose a member for sealing a pipe path on the plate mating surface, and thus it is not necessary to increase the size of the intermediate mold 10 in order to secure a disposition location of the member for sealing the pipe path. As a result, the size of the intermediate mold 10 can be made compact, and thus the size of the injection molding machine 100 can also be made compact.

Another Embodiment

Figure 5:
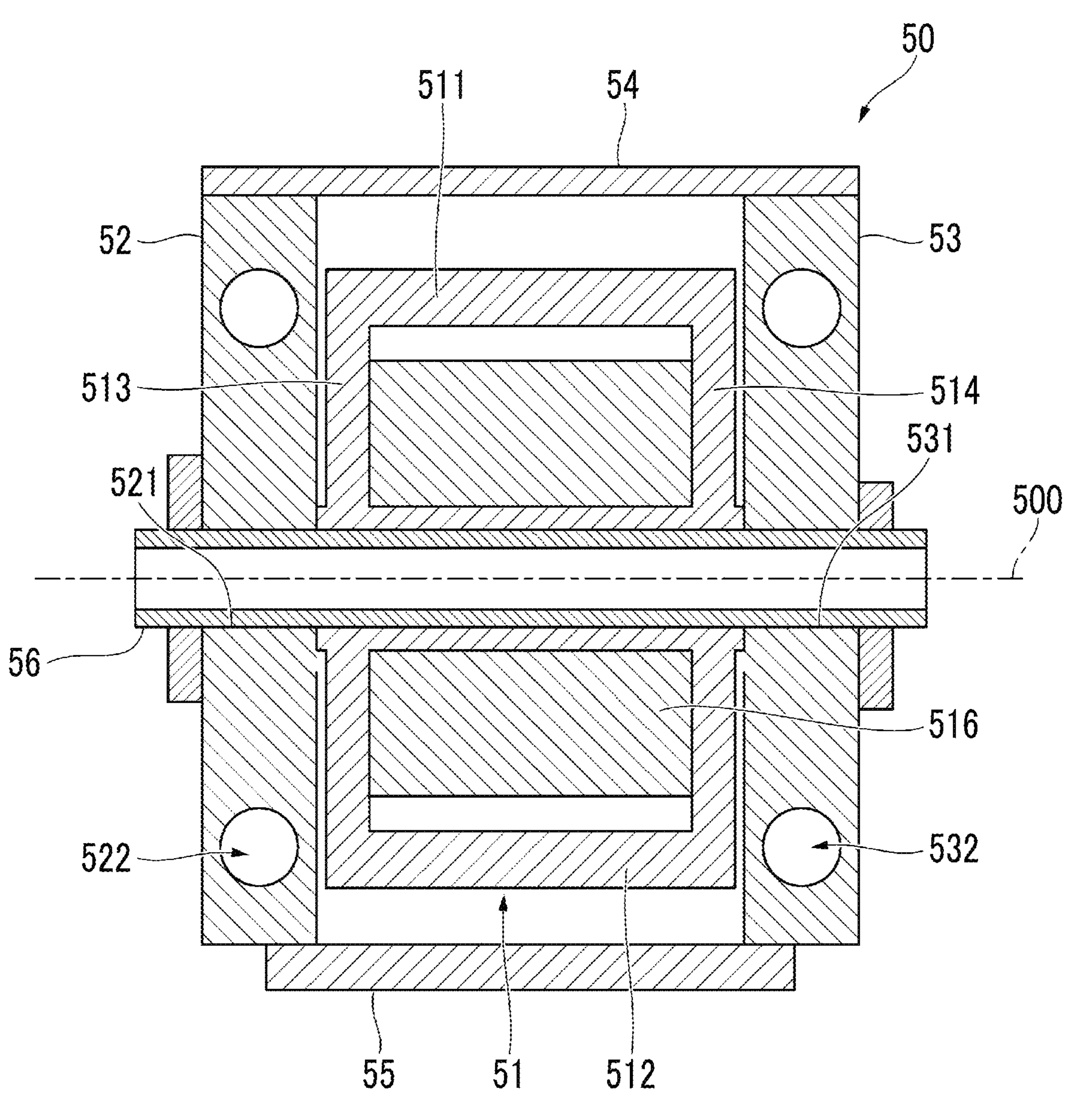
FIG. 5 is a sectional view illustrating an example of an external appearance configuration of an intermediate mold of a mold unit according to another embodiment.

FIG. 5 is a sectional view illustrating an example of a configuration of an intermediate mold 50 of a mold unit according to another embodiment.

The rotating frame body 11 of the intermediate mold 10 according to one embodiment described above is configured, for example, as illustrated in FIG. 2 described above, such that the shaft bodies 16 and 17 are attached to the first side portion 113 and the second side portion 114, respectively. On the other hand, a rotating frame body 51 of the intermediate mold 50 according to another embodiment is configured such that a shaft body 56 penetrates a first side portion 513, a plate unit 516, and a second side portion 514.

The shaft body 56 is a member that is rotated by a rotary shaft 500. The shaft body 56 is supported by a bearing portion 521 of a support member 52 and a bearing portion 531 of a support member 53 in a state of penetrating the rotating frame body 51 and the plate unit 516. A drive unit (not illustrated) for rotating the shaft body 56 is connected to the shaft body 56.

Note that the configurations of the support member 52, the support member 53, a connection member 54, and a coupling member 55 according to another embodiment are the same as the configurations of the support member 12, the support member 13, the connection member 14, and the coupling member 15 according to one embodiment described above. That is, the support member 52 is a member including the bearing portion 521 that supports the first side portion 513 of the rotating frame body 51 in an attachable and detachable manner via the shaft body 56, and a through-hole 522 for sliding a tie bar (not illustrated). In addition, the support member 53 is a member including the bearing portion 531 that supports the second side portion

514 of the rotating frame body 51 in an attachable and detachable manner via the shaft body 56, and a through-hole 532 for sliding the tie bar.

In addition, the connection member 54 is a member detachably connected to the top sides of the support member 52 and the support member 53. Each of a connecting part between the connection member 54 and the support member 52 and a connecting part between the connection member 54 and the support member 53 is detachably connected by a bolt (not illustrated). In addition, the coupling member 55 is a member detachably connected to the bottom sides of the support member 52 and the support member 53, and is detachably fixed to the inside of the injection molding machine 100 (refer to FIGS. 1A and 1B). The coupling member 55 functions as a member that performs positioning of the support member 52 and the support member 53.

The rotating frame body 51, the support member 52, the support member 53, the connection member 54, the coupling member 55, and the shaft body 56 that constitute the intermediate mold 50 can be disassembled. Therefore, in a case of performing maintenance of the plate unit 516 attached to the rotating frame body 51 and the plate unit (hereinafter, referred to as "plate unit 516 or the like") (not illustrated) that is rotated together with the rotating frame body 51, the shaft body 56 penetrating the support member 52, the rotating frame body 51, the plate unit 516, and the support member 53 is pulled out, and the connection member 54 is removed from the support members 52 and 53. In a case where the connection member 54 is removed, a space can be secured on the top side of the intermediate mold 50.

In a case where a space is secured on the top side of the intermediate mold 50, the rotating frame body 51 to which the plate unit 516 or the like is attached is taken out and maintenance is performed by using the space. Specifically, the rotating frame body 51 to which the plate unit 516 or the like is attached is taken out through the window portion 40 on the top side of the injection molding machine 100 illustrated in FIGS. 1A and 1B, and the maintenance is performed. In addition, the details of specific work when the rotating frame body 51 to which the plate unit 516 or the like is attached is taken out are basically the same as the contents described with reference to FIG. 4 described above, except for the work of pulling out the shaft body 56, and the description thereof will be omitted.

That is, the intermediate mold 50 according to another embodiment is the intermediate mold disposed between the stationary-side mold 30 and the movable-side mold 20 in the mold unit 1 of the injection molding machine 100, and the intermediate mold 50 includes the support portion (the support member 52, the support member 53, and the coupling member 55) that supports, in an attachable and detachable manner, both sides (the first side portion 513 and the second side portion 514) of the rotary shaft 500 of the mold portion (the rotating frame body 51 to which the plate unit (not illustrated) rotated together with the rotating frame body 51 is attached) that is rotated; and the connection member 54 that is detachably connected to the top side of the support portion in a top-bottom direction, in which in a case where the mold portion is attached to and detached from the support portion, the mold portion is attached and detached through a space (space formed on the top side of the intermediate mold 50) formed by removing the connection member 54 from the support portion.

Here, the support portion may support both sides (the first side portion 513 and the second side portion 514) of the mold portion in an attachable and detachable manner via the shaft body 56 penetrating the mold portion.

Accordingly, since the support portion supports both sides of the mold portion in an attachable and detachable manner via the shaft body 56 penetrating the mold portion, the support portion is different from a configuration in which the shaft bodies are respectively attached to both sides of the mold portion (for example, the configuration of FIG. 2). Therefore, the total of two times of the attachment and detachment work for respectively attaching and detaching the shaft bodies to and from both sides of the mold portion at the time of maintenance can be reduced to one time of the attachment and detachment work.

Still Another Embodiment

The rotating frame body 11 of the intermediate mold 10 according to one embodiment described above is configured, for example, as illustrated in FIG. 2 described above, such that, with respect to the first side portion 113 and the second side portion 114, the shaft bodies 16 and 17 are respectively inserted into the bearing portions 121 and 131 of the support members 12 and 13 respectively via the first side portion 113 and the second side portion 114 of the rotating frame body 11 from the inside of the intermediate mold 10, and are respectively attached to the first side portion 113 and the second side portion 114, but the present invention is not limited thereto. For example, as illustrated in FIG. 6, a configuration may be adopted in which each of the shaft bodies does not penetrate the first side portion and the second side portion.

Figure 6:
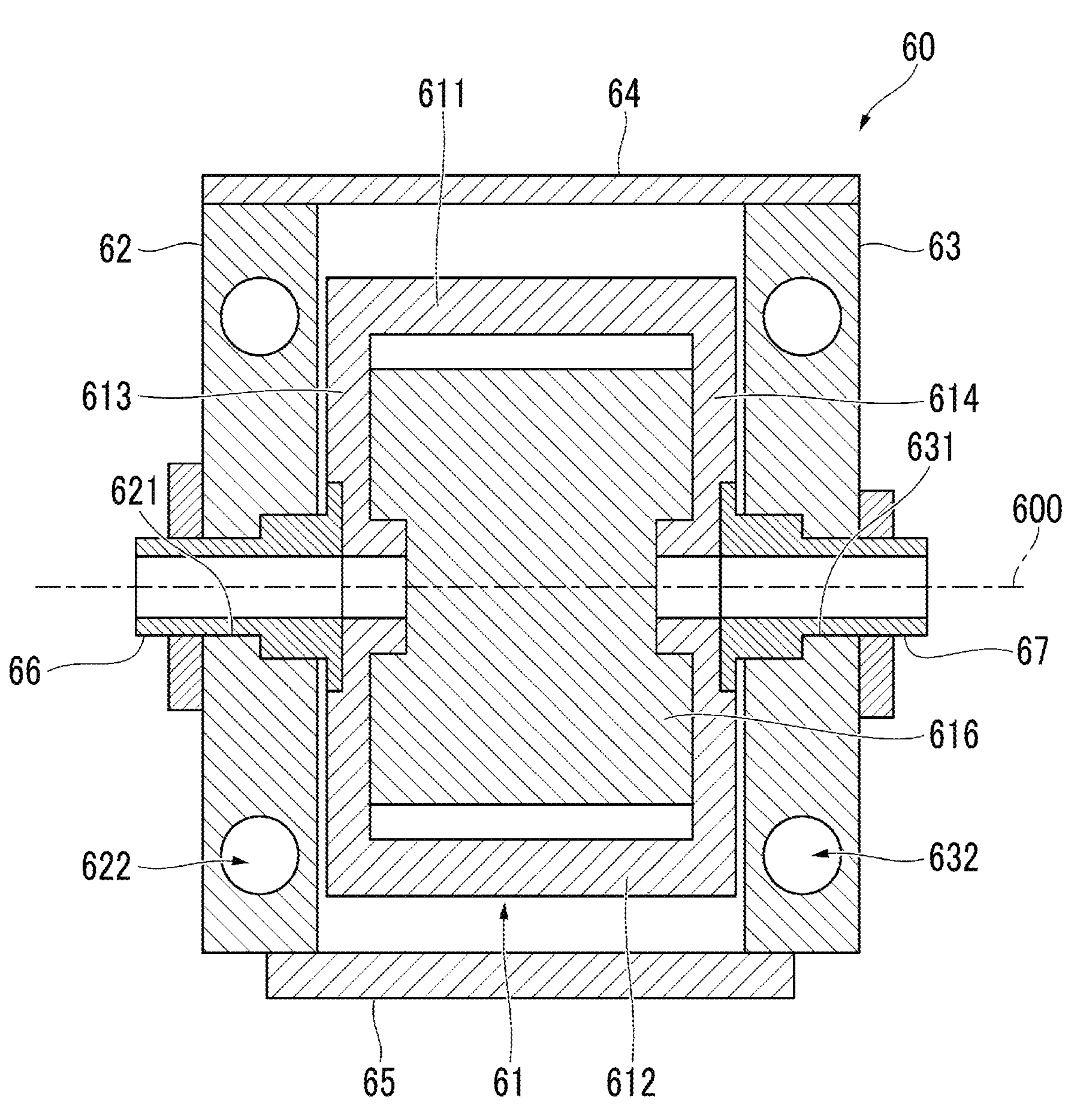
FIG. 6 is a sectional view illustrating an example of a configuration of an intermediate mold of a mold unit according to still another embodiment.

FIG. 6 is a sectional view illustrating an example of a configuration of an intermediate mold 60 of a mold unit according to still another embodiment.

The intermediate mold 60 illustrated in FIG. 6 is configured such that the mold portion (a plate unit 616 and a rotating frame body 61 to which a plate unit (not illustrated) that is rotated together with the rotating frame body 61 is attached) is removed in a state where shaft bodies 66 and 67 are respectively supported by bearing portions 621 and 631. In this case, the shaft bodies 66 and 67 are detachably attached to the mold portion from the outside.

Specifically, an end portion of the shaft body 66 is detachably fixed to a first side portion 613 of the rotating frame body 61 by a bolt or the like, and an end portion of the shaft body 67 is detachably fixed to a second side portion 614 of the rotating frame body 61 by a bolt or the like. Each of the bearing portions 621 and 631 is provided with a storage space (not illustrated) capable of storing an inner end portion of each of the shaft bodies 66 and 67. Accordingly, in a case of taking out the mold portion, the shaft bodies 66 and 67 are removed from the mold portion and stored in the storage spaces. In this manner, each of the shaft bodies 66 and 67 can be retracted from the trajectory of each of the first side portion 613 and the second side portion 614 of the rotating frame body 61. As a result, it is not necessary to take out each of the shaft bodies 66 and 67 at the time of maintenance of the mold portion, and thus work efficiency can be improved.

Here, it is possible to remove the mold portion without removing the shaft bodies 16 and 17 by respectively providing the storage spaces capable of respectively storing the shaft bodies 16 and 17 in the bearing portions 121 and 131 according to one embodiment illustrated in FIG. 2 described above. However, the portions of the shaft bodies 16 and 17 protruding in the direction toward the mold portion from the support portion are longer as compared with a case of the shaft bodies 66 and 67 according to still another embodiment illustrated in FIG. 6, and therefore, a large storage space is required. On the other hand, the portions of the shaft bodies 66 and 67 of FIG. 6, protruding in the direction toward the mold portion from the support portion are short, and therefore, the storage space can be reduced.

Furthermore, since the shaft bodies 16 and 17 of FIG. 2 include portions disposed inside the mold portion, in a case of removing the shaft bodies 16 and 17, the first side portion 113 and the second side portion 114 of the rotating frame body 11 are divided to facilitate the removal of the shaft bodies 16 and 17. On the other hand, since the shaft bodies 66 and 67 of FIG. 6 do not include portions disposed inside the mold portion, the shaft bodies 66 and 67 can be easily removed without dividing the first side portion 613 and the second side portion 614 of the rotating frame body 61. In this regard, still another embodiment is more preferable than one embodiment.

In addition, a removable portion (not illustrated) may be provided in each of the bearing portions 621 and 631. In this case, after the portion is removed outward, each of the shaft bodies 66 and 67 is removed outward from each of support members 62 and 63. In this case, in a case where a bolt or the like for fixing the rotating frame body 61 and the shaft bodies 66 and 67 is attached from the outside, it is easy to perform work for removing the bolt or the like.

Note that, in the example of FIG. 6, the configurations of the support member 62, the support member 63, a connection member 64, and a coupling member 65 are the same as the configurations of the support member 12, the support member 13, the connection member 14, and the coupling member 15 according to one embodiment described above. That is, the support member 62 is a member including the bearing portion 621 that supports the first side portion 613 of the rotating frame body 61 in an attachable and detachable manner, and a through-hole 622 for sliding a tie bar (not illustrated). In addition, the support member 63 is a member including the bearing portion 631 that supports the second side portion 614 of the rotating frame body 61 in an attachable and detachable manner, and a through-hole 632 for sliding the tie bar.

In addition, the connection member 64 is a member detachably connected to the top sides of the support member 62 and the support member 63. Each of a connecting part between the connection member 64 and the support member 62 and a connecting part between the connection member 64 and the support member 63 is detachably connected by a bolt (not illustrated). In addition, the coupling member 65 is a member detachably connected to the bottom sides of the support member 62 and the support member 63, and is detachably fixed to the inside of the injection molding machine 100 (refer to FIGS. 1A and 1B). The coupling member 65 functions as a member that performs positioning of the support member 62 and the support member 63.

Here, in a case where one to still another embodiments are compared to each other, the intermediate mold 60 according to still another embodiment illustrated in FIG. 6 includes more rotating portions than the intermediate mold 10 according to one embodiment illustrated in FIG. 2 and the intermediate mold 50 according to another embodiment illustrated in FIG. 5, and therefore, the weight of the plate unit 616 and the plate unit or the like (not illustrated) that is rotated together with the rotating frame body 61 is added to the rotating portions. In the absence of such an issue, one embodiment and another embodiment are more preferable than still another embodiment.

It should be understood that the invention is not limited to the above-described embodiment, but may be modified into various forms on the basis of the spirit of the invention. Additionally, the modifications are included in the scope of the invention.

What is claimed is:

1. An intermediate mold disposed between a stationary-side mold and a movable-side mold in a mold unit of an injection molding machine, the intermediate mold comprising:

a support portion that supports, in an attachable and detachable manner, both sides of a rotary shaft of a mold portion that is rotated; and a connection member that is detachably connected to a top side of the support portion in a top-bottom direction, wherein, in a case where the mold portion is attached to and detached from the support portion, the mold portion is attached and detached through a space formed by removing the connection member from the support portion, wherein the support portion comprises a first support member that supports one side of the rotary shaft, and a second support member that supports the other side of the rotary shaft, the first support member and the second support member including a through-hole that penetrates in a direction perpendicular to an axial direction, the through-hole being provided at a position closer to an end portion than to the rotary shaft on each of a top side and a bottom side of the first support member and the second support member in the top-bottom direction.

2. The intermediate mold according to claim 1, wherein support portion further comprises a coupling member that performs positioning of the first support member and the second support member.

3. The intermediate mold according to claim 2, wherein the coupling member is detachably connected to bottom sides of the first support member and the second support member in a top-bottom direction, and is detachably fixed to an inside of the injection molding machine.

4. The intermediate mold according to claim 3, wherein a width of the connection member in an axial direction is greater than widths of the first support member and the second support member in the axial direction.

5. A mold unit of an injection molding machine, comprising the intermediate mold according to claim 1, the stationary-side mold, and the movable-side mold.

6. An injection molding machine comprising a mold unit including the intermediate mold according to claim 1, the stationary-side mold, and the movable-side mold.

7. An intermediate mold disposed between a stationary-side mold and a movable-side mold in a mold unit of an injection molding machine, the intermediate mold comprising:

a support portion that supports, in an attachable and detachable manner, both sides of a rotary shaft of a mold portion that is rotated; and a connection member that is detachably connected to a top side of the support portion in a top-bottom direction, wherein, in a case where the mold portion is attached to and detached from the support portion, the mold portion is attached and detached through a space formed by removing the connection member from the support portion, wherein a jig that fixes the connection member and the mold portion is configured to be attached to and detached from the connection member and the mold portion.

8. An intermediate mold disposed between a stationary-side mold and a movable-side mold in a mold unit of an injection molding machine, the intermediate mold comprising:

a support portion that supports, in an attachable and detachable manner, both sides of a rotary shaft of a mold portion that is rotated; and a connection member that is detachably connected to a top side of the support portion in a top-bottom direction, wherein, in a case where the mold portion is attached to and detached from the support portion, the mold portion is attached and detached through a space formed by removing the connection member from the support portion, wherein the support portion supports both sides of the mold portion in an attachable and detachable manner via one or more shaft bodies that are attachable to and detachable from the mold portion.

9. The intermediate mold according to claim 8, wherein the support portion has an integral structure, and is fixed to the injection molding machine.

10. The intermediate mold according to claim 8, wherein the support portion supports, in an attachable and detachable manner, shaft bodies that are detachably attached to both sides of the mold portion, respectively.

11. The intermediate mold according to claim 10, wherein the shaft bodies attached to both sides of the mold portion are each supported by a bearing portion of a first support member and a bearing portion of a second support member of the support portion.

12. The intermediate mold according to claim 10, wherein the mold portion includes a rotating frame body and plate units including a plurality of mold plates, and the shaft bodies are detachably attached to a first side portion and a second side portion of the rotating frame body and are rotated by the rotary shaft.

13. The intermediate mold according to claim 12, wherein the rotating frame body includes a top-side portion, a bottom-side portion, the first side portion, and the second side portion, and the top-side portion, the bottom-side portion, the first side portion, and the second side portion are coupled to each other by a bolt.

14. The intermediate mold according to claim 8, wherein the support portion supports, in an attachable and detachable manner, both sides of a shaft body penetrating the mold portion.

* * * * *